United States Patent
Tseitlin et al.

(10) Patent No.: US 9,864,666 B2
(45) Date of Patent: *Jan. 9, 2018

(54) METHOD AND SYSTEM FOR EVALUATING THE RESILIENCY OF A DISTRIBUTED COMPUTING SERVICE BY INDUCING LATENCY

(71) Applicant: NETFLIX, INC., Los Gatos, CA (US)

(72) Inventors: Ariel Tseitlin, Sunnyvale, CA (US);
Praveen Sadhu, Sunnyvale, CA (US);
Sudhir Tonse, Fremont, CA (US);
Pradeep Kamath, Sunnyvale, CA (US)

(73) Assignee: NETFLIX, INC., Los Gatos, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/691,538

(22) Filed: Apr. 20, 2015

(65) Prior Publication Data
US 2015/0227444 A1 Aug. 13, 2015

Related U.S. Application Data

(63) Continuation of application No. 13/445,862, filed on Apr. 12, 2012, now Pat. No. 9,015,289.

(51) Int. Cl.
*G06F 15/16* (2006.01)
*G06F 11/263* (2006.01)
(Continued)

(52) U.S. Cl.
CPC ........ *G06F 11/263* (2013.01); *G06F 11/2205* (2013.01); *G06F 11/36* (2013.01); *H04L 29/08072* (2013.01)

(58) Field of Classification Search
CPC .......................... H04L 29/08072; H04L 29/06
(Continued)

(56) References Cited

U.S. PATENT DOCUMENTS 5,561,763 A 10/1996 Eto et al.
6,618,389 B2 9/2003 Hoefelmeyer et al.
(Continued)

FOREIGN PATENT DOCUMENTS

GB 2477921 A 8/2011
JP H0947103 A 2/1997
(Continued)

OTHER PUBLICATIONS

Toshitaka Agata, "Java: Good and Bad Application Design Features,"Web + DB Press, vol. 25, pp. 210-219 (Japanese source article plus translation of relevant excerpt).
(Continued)

*Primary Examiner* — Khanh Dinh
(74) *Attorney, Agent, or Firm* — Artegis Law Group, LLP

(57) ABSTRACT

Techniques are disclosed for validating the resiliency of a networked application made available using a distributed computing infrastructure. In one embodiment, a latency monitoring application observes each active application component and at specified or unspecified intervals, selects one and introduces latency or error messages in one or more messages emanating from the selected active application component. The latency monitoring application then measures the effect of the latency or error messages on other active application components that are dependent on the affected active application component. By observing the effects of the failed server on the rest of the network application, a provider can ensure that each component can tolerate any unexpected latency or error conditions with the distributed computing infrastructure.

22 Claims, 4 Drawing Sheets

(51) Int. Cl.
*H04L 29/08* (2006.01)
*G06F 11/36* (2006.01)
*G06F 11/22* (2006.01)

(58) Field of Classification Search
USPC .............................. 709/220, 224, 227, 232
See application file for complete search history.

(56) References Cited

U.S. PATENT DOCUMENTS

| | | | |
|---|---|---|---|
| 6,879,562 B2 | 4/2005 | Hoefelmeyer et al. | |
| 7,240,364 B1 * | 7/2007 | Branscomb | H04L 29/12113 726/5 |
| 7,336,613 B2 | 2/2008 | Lloyd et al. | |
| 8,073,946 B1 | 12/2011 | Jaeger et al. | |
| 8,478,816 B2 * | 7/2013 | Parks | G06F 9/4856 709/203 |
| 8,588,748 B2 * | 11/2013 | Buhrman | G06Q 20/4014 455/410 |
| 9,015,289 B2 * | 4/2015 | Tseitlin | G06F 11/36 709/206 |
| 9,612,935 B2 * | 4/2017 | Sinha | G06F 11/3612 |
| 2003/0039212 A1 * | 2/2003 | Lloyd | H04L 12/2602 370/235 |
| 2006/0101307 A1 * | 5/2006 | Rapp | G06F 9/54 714/13 |
| 2011/0138246 A1 | 6/2011 | Gardner | |
| 2012/0144498 A1 * | 6/2012 | Buhrmann | G06Q 20/4014 726/26 |

FOREIGN PATENT DOCUMENTS

| | | |
|---|---|---|
| WO | 2010131425 A1 | 11/2010 |
| WO | 2012/040241 A1 | 3/2012 |
| WO | 2012040241 A1 | 3/2012 |

OTHER PUBLICATIONS

Ishii, "Netscape Enterprise Server," Enterprise Server 3.0, Netscape Catalog, pp. 34-53.
Toshitaka Agata, "Java: Good and Bad Application Design Features," Web +DB Press, vol. 25, pp. 210-219 (Japanese source article plus translation of relevant excerpt).
Extended European Search Report for EP Application No. 13163304.2 dated Aug. 21, 2017, 9 pages.
Hairong Qi et al., "A Resilient Real-Time System Design for a Secure and Reconfigurable Power Grid", IEEE Transactions on Smart Grid, IEEE, USA, vol. 2, No. 4, Dec. 1, 2011, pp. 770-781.
Kathleen McGill et al., "Computational Resiliency for Distributed Applications", Military Communications Conference, 2011—Milcom 2011, IEEE, Nov. 7, 2011, pp. 1472-1479.

* cited by examiner

US 9,864,666 B2

METHOD AND SYSTEM FOR EVALUATING THE RESILIENCY OF A DISTRIBUTED COMPUTING SERVICE BY INDUCING LATENCY

CROSS-REFERENCE TO RELATED APPLICATIONS

This application is a continuation of co-pending the U.S. patent application having Ser. No. 13/445,862 and filed Apr. 12, 2012. The subject matter of this related application is hereby incorporated herein by reference.

BACKGROUND OF THE INVENTION

Field of the Invention

Embodiments of the present invention generally relate to distributed computing systems and methods, and more specifically to evaluating the resiliency of a distributed computing service by inducing latency.

Description of Related Art

A broad variety of computing applications have been made available to users over computer networks. Frequently, a networked application may be provided using multiple interacting computing nodes within a distributed computer system. The networked application exists as one or more networked application components executing on one or more computing nodes. For example, a web site may be provided using a web server (running on one node within the distributed computing system) configured to receive requests from users for web pages. The requests can be passed to an application server (running on another node within the distributed computing system), which in turn processes the requests and generate responses passed back to the web server, and ultimately to the users.

Another example of a networked application includes a content distribution system used to provide access to media titles over a network. Typically, a content distribution system may include various servers such as access servers and content servers. Clients may connect to the servers using a content player, such as a gaming console, computing system, computing tablet, mobile telephone, or network-aware DVD player. The content server stores files (or "streams") available for download from the content server to the content player. Each stream may provide a digital version of various forms of video or other content, such as a movie, a television program, a sporting event, user generated content, or a staged or live event captured by recorded video. Users access the service by connecting to a web server, where a list of content is available. Once a request for a particular title is received, the title may be streamed to the client system over a connection to an available content server.

In systems such as these, latency and errors may occur in various communication paths between a networked application component running on one server and a dependent networked application component running on another server. These latency or error conditions may result from a server or network device that is overburdened or has experienced a software or hardware failure. In some cases, the dependent networked application component may not be resilient to such latency or errors in the communication paths with the target application. As a result, the dependent networked application components may in turn introduce latency or errors in communication paths to other networked application components, potentially cascading latency, error conditions, or other problems in one or more application components throughout the distributed computer system.

Such cross-latencies and errors across multiple networked application components are difficult to test, in that latencies and errors within a complex distributed computer system are difficult to sufficiently model accurately. Network application components that may appear to be sufficiently resilient on a test system may nevertheless fail when deployed on the distributed computer system. As the foregoing illustrates, what is needed is a better way to test the resiliency of an application running on a distributed computer system.

SUMMARY OF THE INVENTION

One embodiment of the invention disclosed herein provides a computer-implemented method for evaluating resiliency of a networked application. The method may include identifying a plurality of active application components within a network through which the networked application is provided, selecting a first active application component from the plurality of active application components based on one or more selection criteria, altering a message transmitted by the first active application component according to a predefined alteration rule, and monitoring a second active application component included in the plurality of active application components to determine an effect on the second active application component caused by the altered message.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
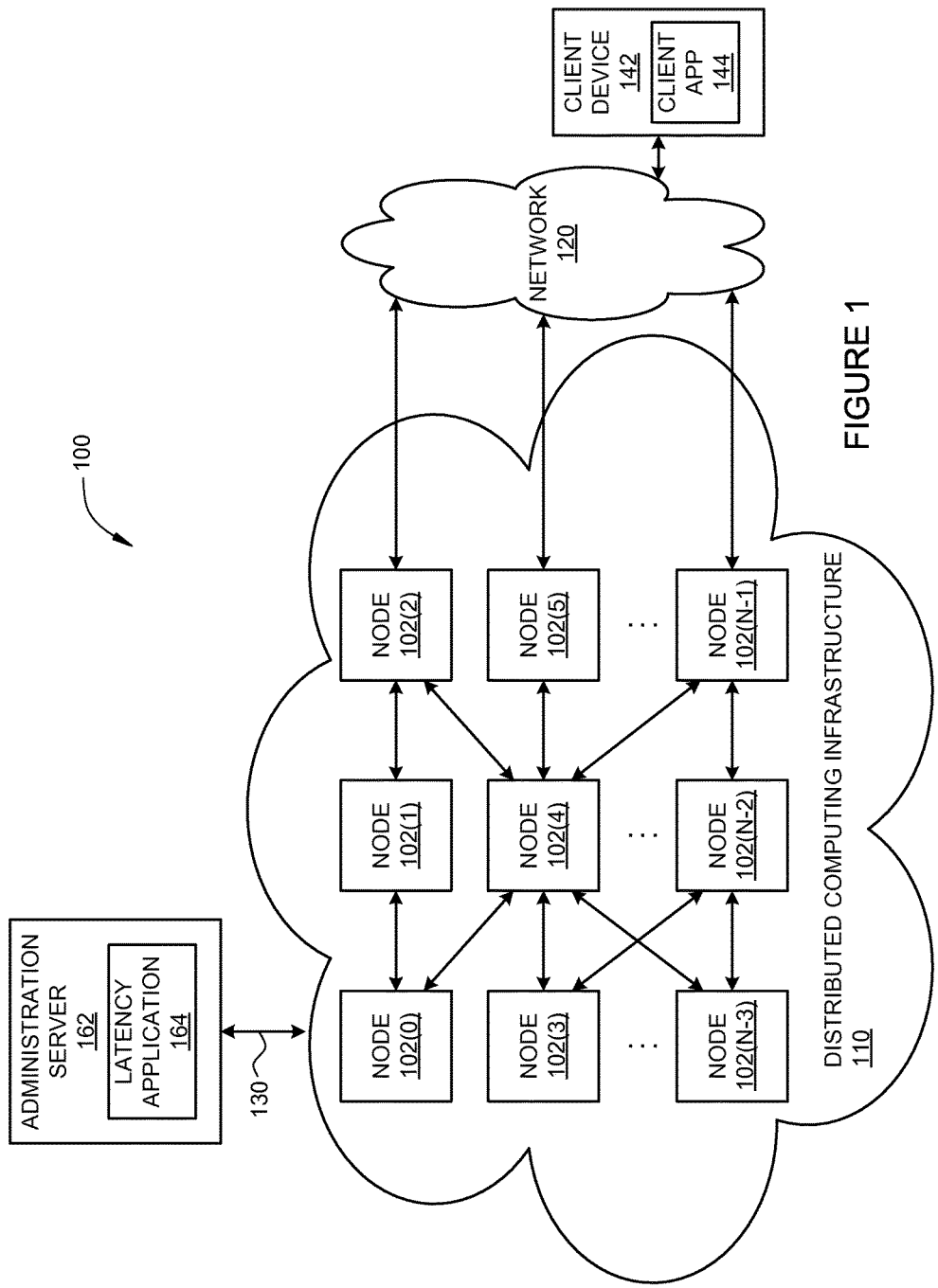
FIG. 1 illustrates a distributed computing system configured to implement one or more aspects of the present invention.

Embodiments of the invention provide techniques for validating the resiliency of a networked application made available using a collection of interacting computing elements within a distributed computing system. Such computing elements are referred to herein as nodes. For example, a network monitoring application (referred hereafter as a latency application) may be configured to introduce latency or errors into communication paths associated with an instance of a target networked application component that is running on a particular node. The latency application may then determine whether systems that depend on the target networked application component can still function correctly (or degrade gracefully) following such induced latency or error conditions. Thus, the latency application may observe the impact of latency or error conditions on other systems within the distributed computing system in a controlled manner. This approach may be useful in cloud based computing environments, where the location of various computing components is unknown, as well as for physical servers in a data center.

In one embodiment, the latency application observes each running application component at unspecified intervals, selects one of the running application components, and introduces latency or error in one or more of the application component's communication paths. The selected application component is referenced herein as the target application component. The latency application then observes changes in behavior of application components dependent on the target application component.

By observing the effects on dependent application components, a provider can ensure that each component can tolerate such latency or errors. In one embodiment, the latency application may be used in a test environment prior to deploying an update or patch to application components or other software modules in a production environment. Doing so allows the effects of the update or patch to be evaluated without being deployed to the production environment. In another embodiment, the latency application may be used in a production environment where latency or errors are introduced in a distributed computer system while the system is online. Thus, in various embodiments, the latency application helps enforce requirements for fault tolerance within a distributed computer system, which might otherwise be lost over time as production systems are upgraded, patched, or otherwise changed in manners that create unintended or unwanted dependencies. More generally, any logical group of systems may be defined and tested by the latency application described herein.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Further, particular embodiments of the invention are described using an example of a networked application used to stream movies, music, television programming, or user generated content, over a data communications network to end-user client devices. However, it should be understood that embodiments of the invention may be adapted to validate the resiliency to individual system failure for a broad variety of networked applications or services. Accordingly, references to a streaming media service are merely illustrative and not limiting.

FIG. 1 illustrates a distributed computing system 100 configured to implement one or more aspects of the present invention. As shown, the distributed computer system 100 includes a client device 142 connected to a distributed computing infrastructure 110 (referred to herein as "the cloud") that includes a plurality of compute nodes 102. The client device 142 may be connected to the cloud 110 via a network 120 such as a LAN (Local Area Network), a WAN (Wide Area Network), or the Internet. The cloud 110 provides one or more virtual computing services via standard messaging protocols, such as representational state transfer (REST) over the network 120. Examples of virtual computing services may include processing capacity, storage, and relational databases, among many other types of services. The virtual computing services may include networked applications where various active application components of the networked application execute on a plurality of nodes in communication with each other. For example, node 102(0) may execute one active application component of a networked application. Node 102(0) may communicate with node 102(4), where node 102(4) may execute a second active application component of the same networked application. Node 102(4) may communicate with nodes 102(2), 102(5), 102(N−1), where each of these nodes may execute an instance of a third active application component of the same networked application In one embodiment, the cloud 110 is hosted by a cloud services provider such as Amazon®. The cloud services provider houses the nodes 102 in various datacenters in different physical locations around the world and enables clients to access the cloud services over the network 120. For example, Amazon® hosts a virtual cloud storage solution called Amazon Simple Storage Service™ (S3) as well as a virtual processing solution called Amazon Elastic Compute Cloud™ (EC2), accessible through the internet using common transport protocols such as Hypertext Transport Protocol (http). In another embodiment, a single organization may host both the cloud 110 and the client device 142 in a private network.

Each of the nodes 102 includes a processor (CPU), a memory, a network interface controller (NIC), and one or more non-volatile storage devices such as a hard-disk drive, a magnetic tape drive, optical disk drives, a drive array (e.g., RAID), or the like (not shown). Each node 102 may include an operating system (e.g., Microsoft® Windows™, Linux™ Unix®, etc.) as well as one or more applications stored in memory and running on the CPU. Some of the applications may provide a software framework for various cloud service architectures, such as a distributed database management system like Apache™ Cassandra or distributed application system like Apache™ Hadoop. In one embodiment, each node 102 comprises a blade server, where two or more blade servers are housed in a chassis and share certain resources such as common power supplies and cooling systems.

Client device 142 also includes a processor (CPU), a memory, a NIC, and one or more non-volatile storage devices (not shown). Similar to nodes 102, client device 142 also includes an operating system as well as one or more applications, such as client application 144, stored in memory and running on the CPU. In one embodiment, client computer 142 may be maintained by a data analyst to analyze the distributed computer system 100. Client device 142 may communicate with one or more of the nodes 102 via network 120 (through NICs on the client device 142 and nodes 102). Thus, the client application 144 may access one or more networked applications executing on the cloud 110 by causing the client device 142 to communicate to one or more nodes 102 via the network 120.

An administration server 162 may perform administrative tasks for the distributed computer system 100 autonomously, or may perform administrative tasks in response to one or more commands issued by a system administrator. The administration server 162 may be any computing device that includes conventional components, such as a processor, memory, storage, and network interface, including one of the nodes 102. The administration server 162 may include a software application, such as a latency application 164, that produces a graphical user interface or a command-line interface, and allows a system administrator perform various functions including, without limitation, configuring, monitoring, and testing the cloud 110. The administration server 162 may communicate to one or more of the nodes 102 via communication link 130.

A latency application 164 is configured to execute on administration server 162. As further described below, the latency application 164 schedules one or more simulations of increased latency or error conditions within the cloud 110. The latency application introduces the latency or error conditions in a specified communication path associated with a selected active application component (referred to herein as the target component).

Figure 2:
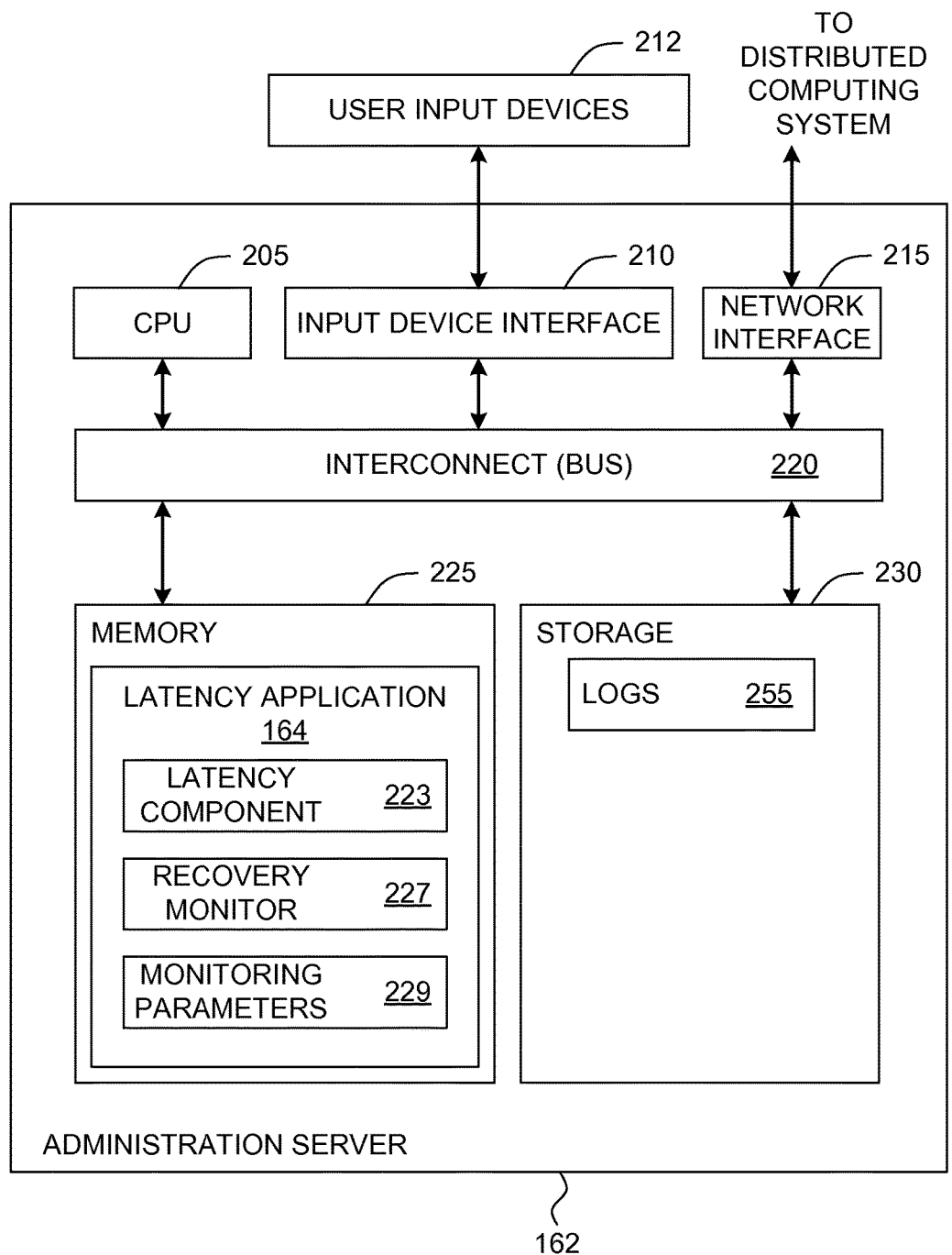
FIG. 2 is a view of the administration server which includes a latency application, according to one embodiment of the invention.

FIG. 2 is a view of the administration server 162 which includes a latency application 164, according to one embodiment of the invention. As shown, the administration server 162 includes, without limitation, a central processing unit (CPU) 205, a network interface 215, an interconnect 220, a memory 225, and storage 230. The administration server 162 may also include an I/O device interface 210 connecting I/O devices 212 (e.g., keyboard, display and mouse devices) to the administration server 162.

In general, the CPU 205 retrieves and executes programming instructions stored in the memory 225. Similarly, the CPU 205 stores and retrieves application data residing in the memory 225. The interconnect 220 facilitates transmission of programming instructions and application data between the CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 includes a latency application 164 and storage 230 includes monitoring logs 235. As shown, the latency application 164 includes a latency component 223, a recovery monitor 227, and simulation monitoring parameters 229. As noted above, the latency application 164 may provide a software application configured to periodically select and introduce latency or error conditions in an active networked application component associated with a networked application. The networked application component may be executing on a node 102 in distributed computing system 100 running in a cloud computing environment or on a server in a provider's data center.

In one embodiment, the latency component 223 selects a target active application component, and simulates latency or error conditions in one or more communications paths associated with the application component. The latency component 223 configures the simulation according to monitoring parameters 229. The monitoring parameters 229 controlling a given simulation may be predetermined automatically by the latency application 164. Alternatively, the latency application may receive one or more monitoring parameters 229 from a system administrator via a graphical or command line interface. For example, the latency application may set a monitoring parameter 229 associated with whether a simulation will operate in latency mode or error mode. If latency mode is specified, the latency application causes the target component to delay messages by a predetermined amount of time. Alternatively, a random delay may be introduced rather than a specific amount of time. If error mode is specified, the latency application causes the target component to introduce an error message in place of an otherwise expected message. For example, in response to a request associated with a specified uniform resource locator (URL), the latency application may cause the target component to return an error message, such as a 404 ("not found") error, rather than the web page at the referenced URL.

Other monitoring parameters 229 associated with a simulation include, without limitation, the number of times a simulation is scheduled to execute, the start time of a simulation, the duration of a simulation, and the duration between successive executions of a simulation. The latency application 164 may also determine whether all messages emanating from the selected component are affected or only messages that meet one or more event descriptors specified by the system administrator. For example, a simulation may be programmed to introduce latency only in response to messages requesting a user's mailing address. In another example, the simulation may be programmed to affect a certain percentage of the total number of messages emanating from the target component.

Once a target application component is selected and the simulation begins, the recovery monitor 227 may observe the actions of application components that are dependent on the target application component. The recovery monitor 227 gathers latency and other information from the dependent application component, and then stores the information in logs 235. The content of logs 235 may include information specified by the monitoring parameters 229 as well as include the logging data created by the dependent application components.

Figure 3:
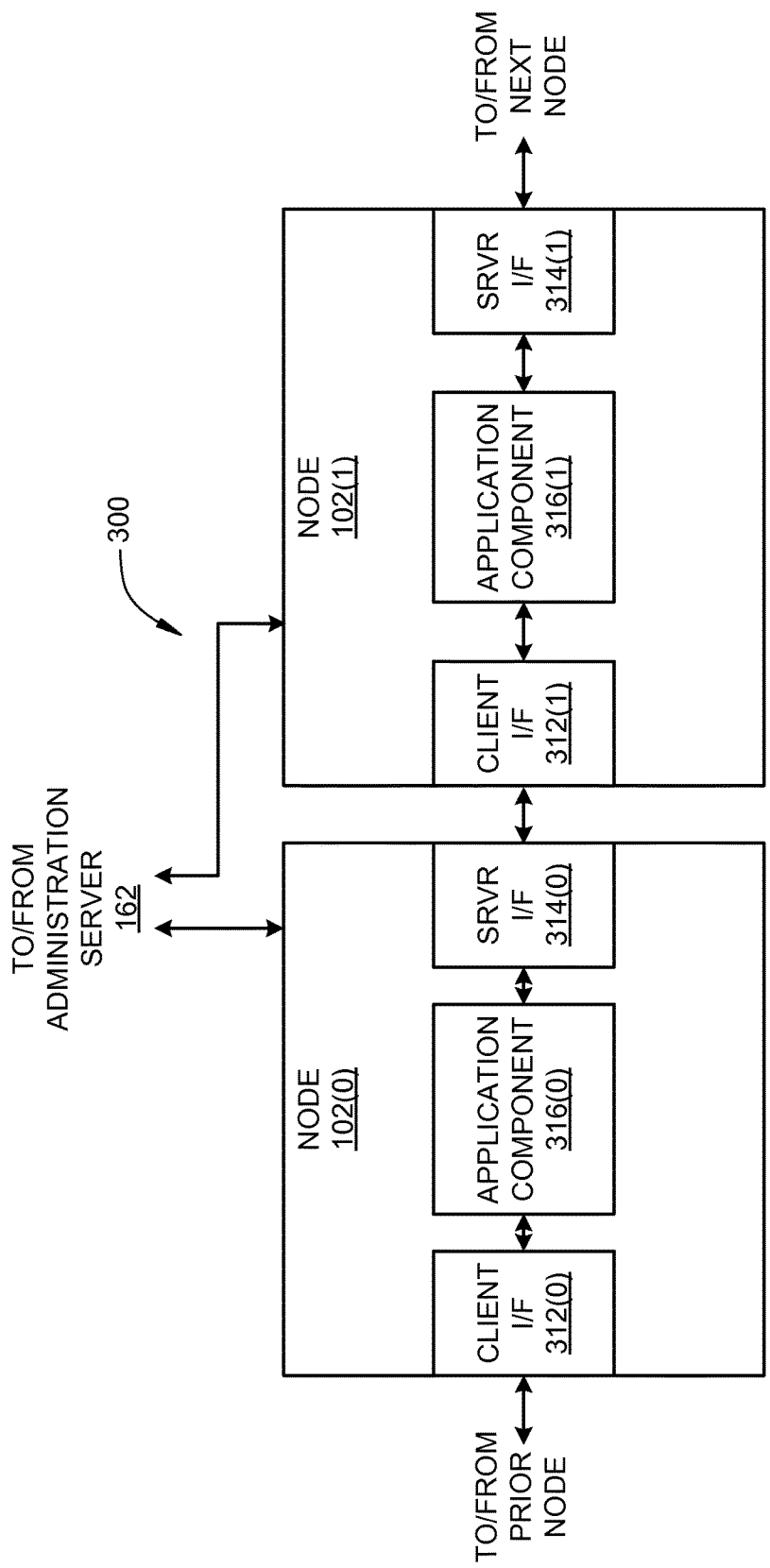
FIG. 3 illustrates two nodes within the distributed computing system, according to one embodiment of the present invention.

FIG. 3 illustrates two nodes 300 within the distributed computing system, according to one embodiment of the present invention. As shown, the nodes include an application component 316, a client interface 312, and a server interface 314.

Application components 316 provide one or more functions associated with a networked application. An application component 316 may function as a server, as a client, or as both a server and a client. For example, application component 316(0) functions as a server for application component 316(1). Correspondingly, application component 316(1) functions as a client of application component 316(0). In addition, application components 316(0), 316(1) may function as clients and servers for other application components executing on other nodes (not shown).

Server interface 314(0) intercepts server-based messages transmitted or received by application component 316(0). Correspondingly, server interface 314(1) intercepts server-based messages transmitted or received by application component 316(1). The server interface 314 performs various functions on these messages including, without limitation, data compression/decompression, and error or exception handling for incorrectly formatted messages. For example, server interface 314(0) may receive a message from client interface 312(1), check the message for proper formatting, and then pass the message to application component 316(0). Application component 316(0) processes the message, and generates a response message. Application component 316(0) transmits the response message to server interface 314(0). Server interface 314(0) performs one or more functions on the response message, and then transmits the response message to client interface 312(1). The server interface 314 may also be programmed to provide test and measurement functions such as measuring the latency between a message from a client and a corresponding response message from the server. The server interface 314 may then store these measurements for later retrieval and evaluation.

Client interface 312(0) intercepts client-based messages transmitted or received by application component 316(0). Correspondingly, client interface 312(1) intercepts client-based messages transmitted or received by application component 316(1). The client interface 314 performs various functions on these messages including, without limitation, data compression/decompression, error or exception handling for incorrectly formatted messages and re-trying transmission of a message when no response to the message is received from the server. For example, application component 316(1) may generate a message to transmit to application component 316(0). Application component 316(1) transmits the message to client interface 312(1). Client interface 312(1) performs one or more functions on the message, and then transmits the message to server interface 314(0). As described above, server interface 314(0) and application component 316(0) process the message and generated a response message. Client interface 312(1) receives and processes the response message and transmits the response message to application component 316(1). The client interface 314 may also be programmed to provide test and measurement functions such as measuring the latency between a message and a corresponding response message. The client interface 314 may then store these measurements for later retrieval and evaluation.

As described above, the administration server 162 communicates to one or more of the nodes 102 over communications links 130 during the configuration, monitoring, and testing functions. The latency application 164 may use the communication links 130 to configure a simulation, begin execution of a simulation, and collect metrics resulting from a simulation. In particular, the latency application 164 sets parameters within client interfaces 312 and server interfaces 314 to introduce latency or error conditions to messages as they are passed between various application components 316. For example, the latency application 164 may set a parameter in server interface 314(0) to delay messages transmitted to or from application component 316(0) by a predetermined period in order to introduce increased latency. In another example, the latency application 164 may set a parameter in server interface 314(0) to replace messages with an error message rather than the original message. The latency application 164 may configure server interface 314(0) to alter all messages that pass through server interface 314(0), or a certain percentage of messages. Alternatively, the latency application 164 may configure server interface 314(0) to alter messages that meet one or more criteria, including, without limitation, messages that specify an access to a particular uniform resource locater (URL). The latency application 164 may also set parameters on client interface 312(0) in a manner similar to that described above for server interface 314(0).

When the time scheduled for a simulation has arrived, the latency application 164 selects an application component 316(0) (the target application component), writes parameters to client interface 312(0) and server interface 314(0) according to the settings in the simulation, and begins the simulation. During the simulation, application components dependent on the target application component 316(0) may experience increased latency, error conditions, or other problems because of the latency or error conditions introduced by the simulation. The dependent application components may have a direct connection with the target application component 316(0) (direct dependence). Alternatively, dependent application components may have a connection with the target application component 316(0) through one or more other application components (indirect dependence). When the simulation has run for the duration scheduled, the latency application 164 restores parameters within client interface 312(0) and server interface 314(0) to their original operational values, and the simulation terminates. The latency application 164 collects latency information and other metrics by querying client interfaces 312 and server interfaces 314 associated with application components that are directly or indirectly affected by the target application component 316(0). The latency application 164 stores the metrics for later analysis by a system administrator.

Figure 4:
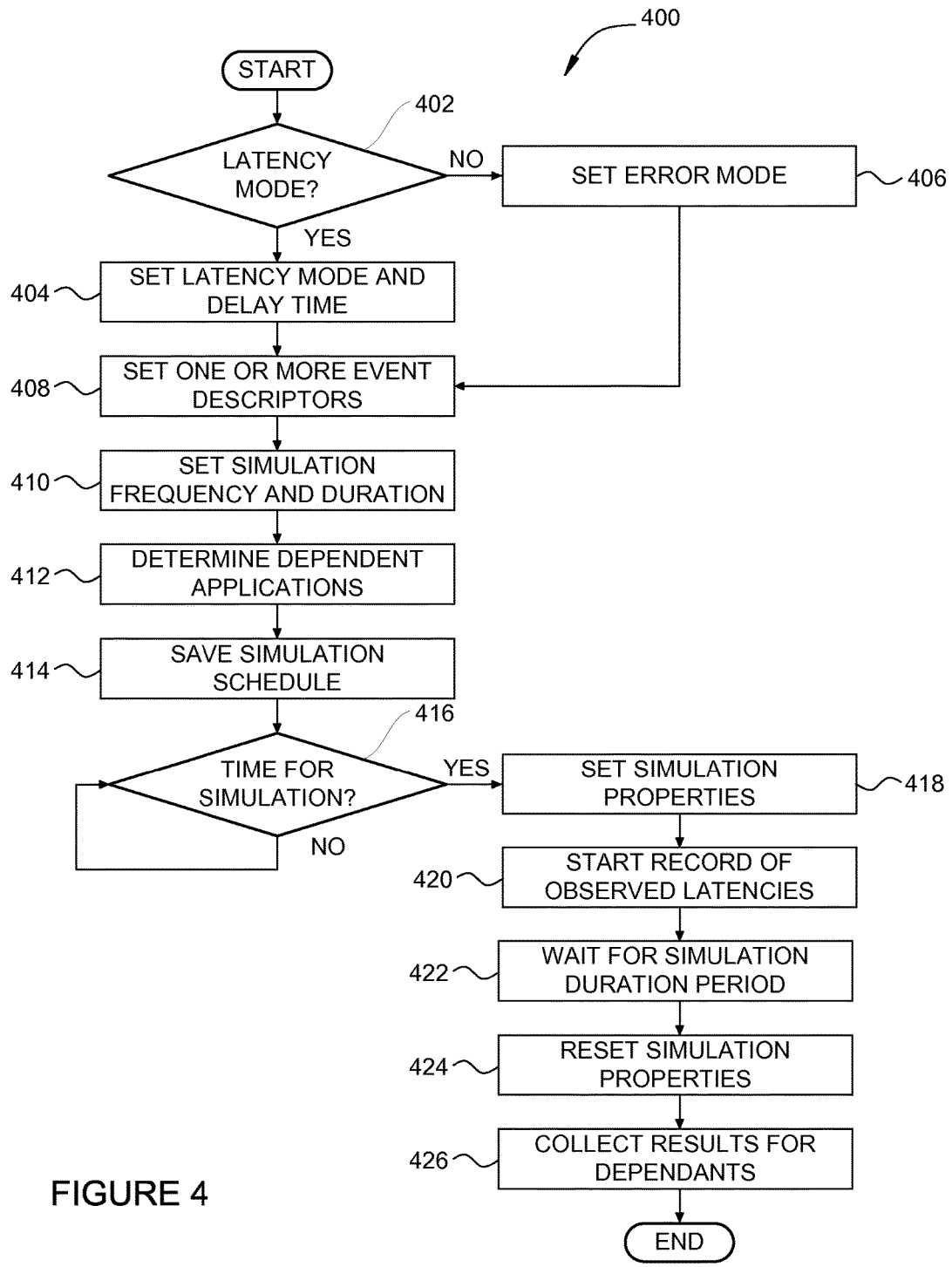
FIG. 4 depicts a method for validating the resiliency of networked applications, according to one embodiment of the present invention.

FIG. 4 depicts a method 400 for validating the resiliency of networked applications, according to one embodiment of the present invention. Although the method steps 400 are described in conjunction with the systems of FIGS. 1-3, persons of ordinary skill in the art will understand that any system configured to perform the method steps 400, in any order, is within the scope of the present invention.

The method 400 begins at step 402, where the latency application 164 determines whether the mode for the simulation is latency mode. If the mode of the simulation is latency mode, then the method proceeds to step 404, where the latency application 164 sets the latency mode for the simulation and sets the delay time associated with the simulation. During the simulation, select messages experience an increased latency related to the delay time, where the delay time may represent, without limitation, an actual delay time, a maximum delay time, or an average delay time. Returning to step 402, if mode of the simulation is not latency mode, then the mode of the simulation is error mode. The method 400 proceeds to step 406, where the latency application 164 sets the error mode. In an error mode simulation, select messages return an error message rather than the appropriate message response.

From either step 404 or 406, the method 400 proceeds to step 408, where the latency application 164 may set one or more event descriptors associated with the simulation such that certain message types experience increased latency or error conditions rather than all messages. For example, the simulation may introduce latency or error conditions only for messages requesting a user's mailing address or for messages that request access to a specified uniform resource locator (URL). If no event descriptors are set, all messages transmitted by the application component are subject to the increased latency or error response. At step 410, the latency application 164 sets the simulation frequency and duration. For example, the simulation may be scheduled for a duration of ten minutes and to occur once, periodically (such as once per week), or at random intervals. At step 412, the latency application 164 determines the set of applications that are dependent on the target application. Dependent applications may be directly dependent on the target application, where the dependent application has a direct communication link with the target application. Alternatively, dependent applications may be indirectly dependent on the target application, where the dependent application may be affected by the target application via one or more intervening applications. At step 414, the latency application 164 saves the simulation schedule including the mode, any applicable event descriptors, and frequency, as described above.

At step 416, the latency application 164 waits until the time to run the simulation has been reached. Once the time to run the simulation has been reached, the method 400 proceeds to step 418 where the latency application 164 sets the simulation properties within the client interface 412 or the server interface 414 according to the previously saved simulation. At step 420, the latency application 164 begins recording of observed latencies within the distributed computer system 100. In particular, the latency application 164 records latencies experienced by applications that are directly or indirectly dependent on the target application. At step 422, the latency application 164 waits for the simulation duration period to expire. At step 424, the latency application 164 resets the simulation properties within the client interface 312 or the server interface 314 according to the original values prior to the simulation. At step 426, the latency application 164 collects the recorded results from the simulation. The latency application 164 may organize the collected results in any technically feasible manner, such as a relational database, report, or series of graphs. The method 400 then terminates.

In sum, the resiliency of networked applications is evaluated within a distributed computer system 100 by introducing latency or error conditions on various communication links. A latency application 164 is configured to schedule a simulation that causes increased latency or error conditions associated with a specific target application. In one embodiment, a latency application 164 observes each active application component and at specified or unspecified intervals, selects one and introduces latency or error messages in one or more messages emanating from the selected active application component. The latency application 164 then measures the effect of the latency or error messages on other active application components that are dependent on the affected active application component.

Advantageously, results from latency or error simulations may be useful to determine resiliency of one or more application components associated with a networked application. By introducing latency and error conditions in a simulation, followed by measuring the effect on dependent components, the information collected by the latency application 164 may be helpful to the system administrator to improve various components in the networked application to be more resilient during periods of increased latency or error conditions.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method, comprising:
    selecting a first active software application component from a plurality of active software application components associated with a networked software application based on one or more selection criteria;
    altering a message transmitted by the first active software application component according to a predefined alteration rule; and
    monitoring a second active software application component included in the plurality of active software application components to determine an effect on a behavior of the second active software application component caused by the altered message.

2. The method of claim 1, wherein altering comprises delaying transmission of the message.

3. The method of claim 1, wherein altering comprises replacing the message with an error message.

4. The method of claim 1, wherein the message comprises a response to a message received from any active software application component included in the plurality of active software application components other than the second active software application component.

5. The method of claim 1, wherein the one or more event descriptors describe an access operation associated with a specified uniform resource locator (URL).

6. The method of claim 5, wherein the message comprises a web page that reside at the specified URL and altering the message comprises transmitting a "not found" error rather than the web page.

7. The method of claim 1, further comprising creating one or more log entries to record the effect on the second active software application component resulting from altering of the message.

8. A non-transitory computer-readable storage medium including instructions that, when executed by a processor, cause the processor to perform one or more operations comprising:
    selecting a first active software application component from a plurality of active software application components associated with a networked software application based on one or more selection criteria;
    altering a message transmitted by the first active software application component according to a predefined alteration rule; and
    monitoring a second active software application component included in the plurality of active software application components to determine an effect on a behavior of the second active software application component caused by the altered message.

9. The computer-readable storage medium of claim 8, wherein altering comprises delaying transmission of the message.

10. The computer-readable storage medium of claim 9, wherein the message is delayed by an amount of time consistent with achieving a target average message delay time.

11. The computer-readable storage medium of claim 8, wherein altering comprises replacing the message with an error message.

12. The computer-readable storage medium of claim 8, wherein the message is in response to a request that meets one or more specified event descriptors.

13. The computer-readable storage medium of claim 12, wherein the one or more event descriptors describe an access operation associated with a specified uniform resource locator (URL).

14. The computer-readable storage medium of claim 8, wherein the operation further comprises creating one or more log entries to record the effect on the second active software application component resulting from altering of the message.

15. A system, comprising:
a processor; and
a memory coupled to the processor and storing a latency application, wherein, when executed by the processor, the latency application causes the processor to perform one or more operations comprising:
selecting a first active software application component from a plurality of active software application components associated with a networked software application based on one or more selection criteria;
altering a message transmitted by the first active software application component according to a predefined alteration rule;
monitoring a second active software application component included in the plurality of active software application components to determine an effect on a behavior of the second active software application component caused by the altered message, and
creating one or more log entries to record the effect on the second active software application component resulting from altering of the message.

16. The system of claim 15, wherein altering comprises delaying transmission of the message.

17. The system of claim 15, wherein altering comprises replacing the message with an error message.

18. The system of claim 15, wherein the message comprises a response to a message received from any active software application component included in the plurality of active software application components other than the second active software application component.

19. The system of claim 15, wherein the message is in response to a request that meets one or more specified event descriptors.

20. The system of claim 19, wherein the one or more event descriptors describe an access operation associated with a specified uniform resource locator (URL).

21. The non-transitory computer-readable storage medium of claim 8, wherein monitoring the second active software application component to determine an effect on the second active software application component comprises collecting one or more metrics related to the behavior of the second active software application component to determine a change in the behavior of the second active software application component.

22. The non-transitory computer-readable storage medium of claim 8, wherein the second active software application component is dependent on the first active software application component.

* * * * *